Figure 1:
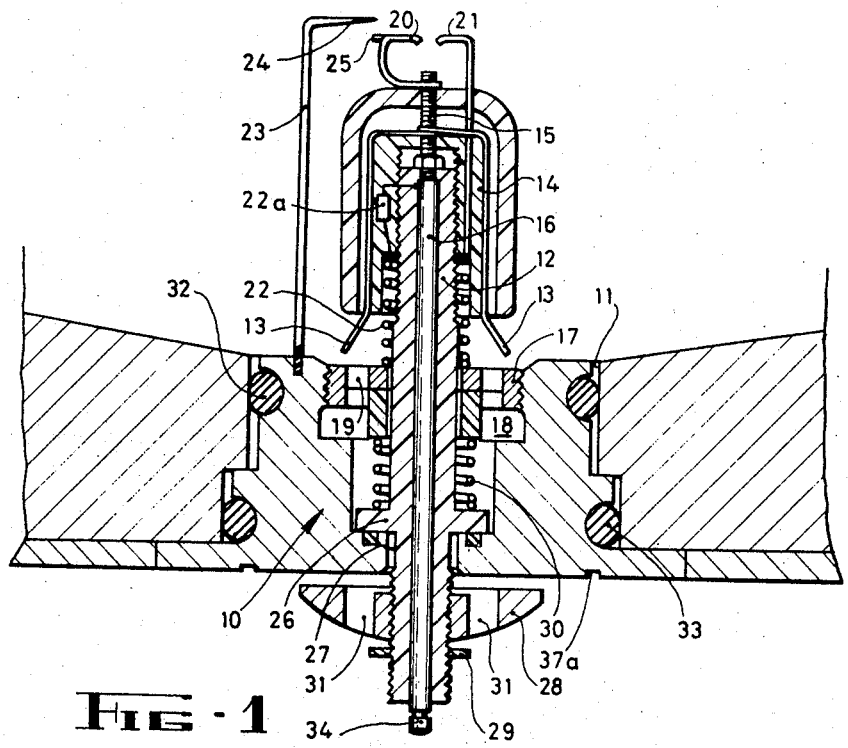

United States Patent [19]

Heeps

[11] 3,793,586
[45] Feb. 19, 1974

[54] APPARATUS FOR DETECTING THE PRESENCE OF WATER IN AIRCRAFT FUEL TANKS

[75] Inventor: Brian Hamilton Heeps, Caulfield, Victoria, Australia

[73] Assignee: Micador Electronics Pty. Limited, Prahran, Victoria, Australia

[22] Filed: Dec. 8, 1971

[21] Appl. No.: 205,969

[52] U.S. Cl.............. 324/65 R, 200/61.05, 340/235
[51] Int. Cl............................................ G01r 27/02
[58] Field of Search 324/65 R, 65 P, 64; 200/61.05, 200/61.06; 340/235, 242; 73/73, 53, 336.5

[56] References Cited
UNITED STATES PATENTS

| | | | |
|---|---|---|---|
| 1,882,316 | 10/1932 | Cleary.................... | 200/61.05 |
| 2,839,742 | 6/1958 | Sumner.................... | 200/61.05 X |
| 3,445,834 | 5/1969 | Street et al. ............ | 200/61.05 X |
| 1,648,197 | 11/1927 | Roodhouse .............. | 324/65 R X |
| 1,913,436 | 6/1933 | Eckstein................... | 324/65 R |
| 2,552,088 | 5/1951 | Davis ....................... | 324/65 R X |
| 2,647,234 | 7/1953 | Pear, Jr. .................. | 324/65 P |
| 3,229,200 | 1/1966 | Rayburn.................. | 324/65 P |
| 3,242,473 | 3/1966 | Shivers, Jr. et al...... | 324/65 P |
| 3,264,557 | 8/1966 | Heeps...................... | 324/65 R |
| 3,264,558 | 8/1966 | Heeps...................... | 324/65 R |
| 3,426,341 | 2/1969 | Hallwood................. | 324/65 R X |
| 3,548,304 | 12/1970 | Lohnes..................... | 324/65 R |
| 3,457,504 | 7/1969 | Arthur et al. ............ | 324/65 R |

Primary Examiner—Stanley T. Krawczewicz
Attorney, Agent, or Firm—Wenderoth, Lind & Ponack

[57] ABSTRACT

This invention relates to apparatus for detecting the presence of water in hydro-carbon fuels whether such water be present in the form of drops or pools or whether it is in suspension in the fuel.

In one form the invention resides in the combination of a valve plug unit comprising spaced sensing electrodes which are so arranged as to detect the presence of water whether it be in suspension or in large drops, and a Continuity Ohm Meter adapted to measure the conductivity or resistance differential of an electrical circuit which is completed by water bridging a gap between said spaced pairs of sensing electrodes.

In another form the invention resides in the provision of sensing electrodes in the Continuity Ohm Meter, said electrodes being so located in the fuel flow line of said meter whereby any water present in the fuel must pass said sensing electrodes, the electrical conductivity of such water being indicated on the meter scale. This embodiment enables the presence of water to be measured accurately without the necessity of employing the valve plug units of the first embodiment.

12 Claims, 7 Drawing Figures

APPARATUS FOR DETECTING THE PRESENCE OF WATER IN AIRCRAFT FUEL TANKS

This invention relates to improved apparatus for detecting the presence of water in hydro-carbon fuels and refers more especially to apparatus for detecting water contamination forming at the drain-off test points installed at a plurality of low sections in aircraft fuel tanks or the like.

In this specification, the term "drain-off test points" includes all such sections of fuel tanks where water will gather by gravitation and where regular checks are made by draining off samples of fuel.

It is essential to the operation of all aircraft that regular tests are carried out to detect water contamination in fuel tanks. These tests are at present made by releasing a valve at the test points and taking the fuel sample into a glass jar for visual examination. However, as will be apparent, there are numerous disadvantages associated with this method. It is time consuming and more important, it is unreliable due to error in visual examination as a result of varying conditions.

It is an object of the present invention to provide apparatus which is more reliable in that the degree of contamination is measured instrumentally and inspection is not relied upon as heretofore.

A further object of the invention is to provide apparatus whereby water in "drops" or "pools" can be detected as distinct from a finely suspended water haze in the fuel.

Accordingly an apparatus for detecting the presence of water in aircraft fuel tanks or the like, comprises a sampling drain plug unit having one or a plurality of sensing probes, the or at least one probe being adapted to detect the presence of water in the fuel in "drops" or "pools" and/or detect the presence of water in suspension in the fuel.

More particularly, two sensing probes are provided, one probe being adapted to detect the presence of water in the fuel in "drops" or "pools" and the other probe being adapted to detect the presence of water in suspension in the fuel, both said probes being connected to external contact points on the drain plug unit so that a meter can be applied to test the conductivity of the fuel at or about either or both sensing probes.

The invention further resides in the combination of a drain plug of the kind hereinbefore described and a Continuity Ohm Meter having pipe means for engaging said plug unit in electrical contact therewith and surrounding a drain outlet in said plug unit, said pipe having a piston therein and electrically insulated from said pipe, said piston being adapted to engage a contact point on the lower end of the valve, said pipe and piston being wired into an electrical circuit in said meter whereby the presence of water at the or each probe electrode can be detected and the conductivity thereof measured on a scale on said meter.

Figure 2:
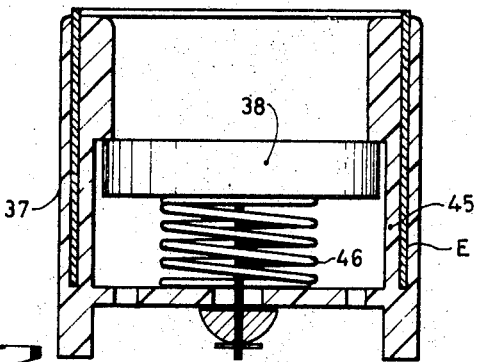
Figure 3:
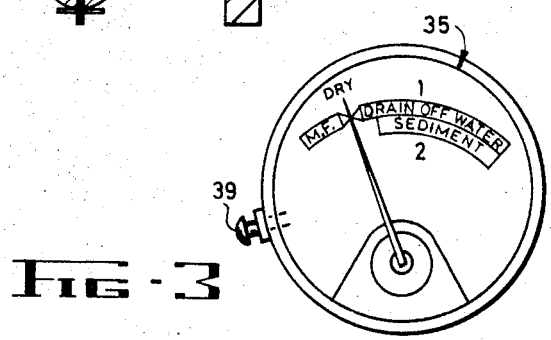
Figure 4:
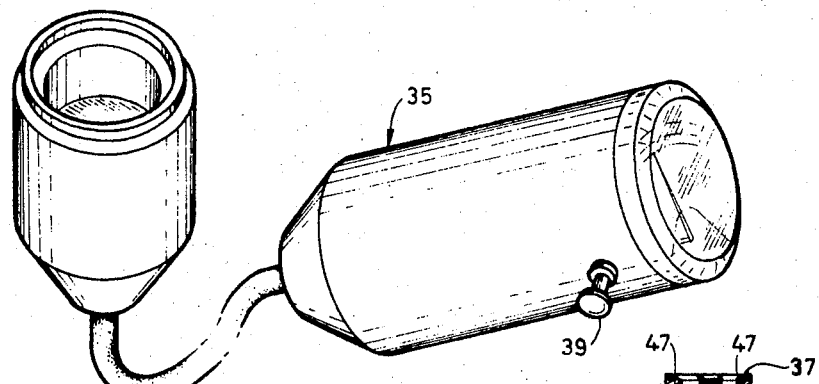
Figure 6:
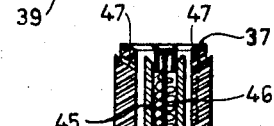
Figure 5:
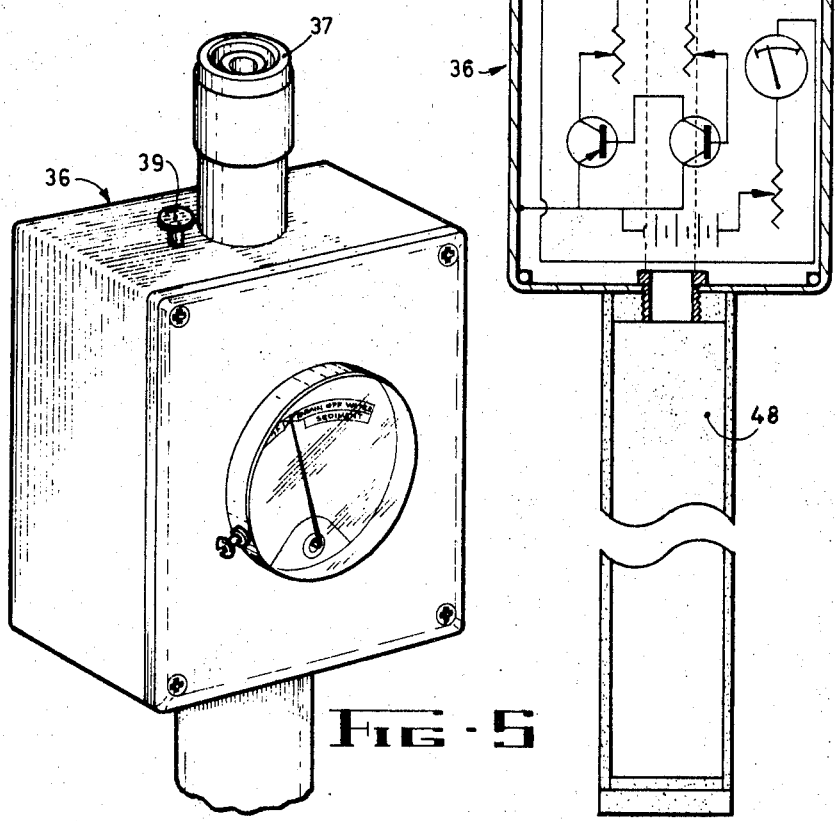
Figure 7:
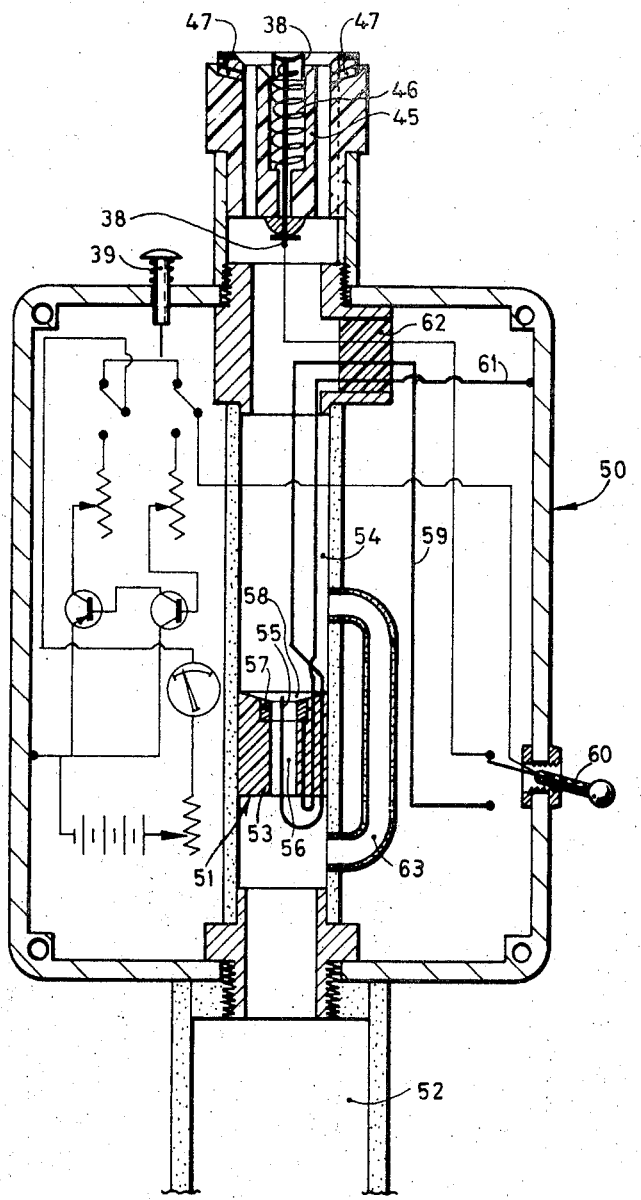

The invention will be more readily understood from the following description of embodiments of the invention which may be preferred and wherein reference is made to the accompanying drawings in which:

FIG. 1, is a view in sectional elevation of a drain plug embodying the invention, FIG. 2, is a sectional view of the test-head of a Continuity Ohm Meter, FIG. 3, is a view of the scale and indicator of the meter of FIG. 2, FIG. 4, is a perspective view of the Meter of FIGS. 2 & 3, FIG. 5, is a perspective view of a Continuity Ohm Meter having facilities for testing and sampling a quantity of fuel, FIG. 6, is a view in section and including a circuit diagram of the Meter of FIG. 5 and, FIG. 7, is a sectional view of a modified meter.

In accordance with the embodiment of FIG. 1, a sampling drain plug unit 10 is fitted for engagement in a drain opening 11 of an aircraft fuel tank in substitution for the drain plugs hitherto in use.

The drain plug 10 is provided with a centrally located spring-loaded sample release valve 12 which, when subjected to pressure from the outside of the valve, allows fuel to escape through said valve as will be hereinafter described.

A pair of primary sensing probes 13 are mounted on an insulator 14 on the valve item 12. The sensing probes 13 are formed from a length of thin gauge gold plated or like wire, said wire being tightly coiled around a threaded pin 15 formed at the upper end of a metallic conductor 16 passing axially through the valve 12. Either the conductor 16 is Polytetrafluoroethylene (P.T.F.E.) or similarly coated, or the valve 12 is constructed from (P.T.F.E.). The probes 13 are thus arranged diametrically opposite each other about the valve 12. The ends of the probes 13 are spaced a short distance, (which distance may be adjusted by screwing the insulator 14 upwardly on the valve 12) from a valve plug 17, which is screwed into a central opening or well 18 in the plug unit 10. The probes are so designed and arranged as to resist or minimise adhesion of water thereto. Any water is thus caused to fall to the bottom of each probe and due to its natural adhesive properties is induced to cling to the plug 17. The plug 17 and plug unit 10 are formed of metal and therefore the plug 17 and plug unit 10 form the other electrical contact for the probes 13. The electrical circuit is completed when drops of water or sediment bridge the gap between the probe electrodes 13 and plug 17 and the presence of water may be detected by means hereinafter described.

A secondary sensing probe is mounted on the top of the valve 12, one probe contact or electrode 20 being attached to the top of the threaded pin 15 and the other probe contact or electrode 21 being embedded in the insulator 14 and passing therethrough to contact a compression spring 22 seated on the valve plug 17. Thus the probe contact 21 is earthed through the spring 22 and plug 17. The probe electrodes or contacts 20, 21 are spaced apart a minute distance, approximately 0.002 inches. The electrodes, 20,21 are provided with sharp edges so as to enable precise setting of the probe gap. A "flicker" bar 23 is mounted on the plug unit 10 so that its upper end 24 which is bent at right angles is situated slightly above and to the rear of the contact 20. The contact 20 is formed with a short rear extension or reed 25 so arranged that as the valve 12 is moved upwardly to permit fuel to be drained from the well 18 the end of the bar 24 engages above the end of the reed 25 so as to flick it as it moves past said bar 24 thereby setting said electrode vibrating. This flicking action or vibration causes any water bridge formed between the electrode contacts 20,21 to be broken.

As will be seen from FIG. 1, the lower end of the valve 12 is flanged as at 26 to seal the well outlet 27. To prevent accidental release of fuel a lock drain washer 28 is screwed upwardly against the outer surface of the plug unit 10. A circlip 29 or the like prevents the lock-drain washer 28 from being completely removed. When the washer 28 is screwed against the plug unit 10 axial movement of the valve 12 is prevented but when the washer 28 is screwed outwardly away from the plug unit 10 the valve 12 is permitted to be raised against the action of compression spring 30 a distance equal to that which the washer has been released. In the action of releasing the valve 12 the washer is again pressed against the surface of the plug unit 10 and fuel expelled through the well outlet 27 is caused to flow through a pair of drain holes 31 in the washer 28. The upper surface of the washer 28 is concave to permit the flow of liquid through said drain holes. The fuel so expelled is taken by either of the test meters of FIG. 4 or 5.

The plug unit 10 is sealed into the opening in the fuel tank by a pair of "O" ring seals 32,33. Thus the only outlet for the fuel is through the valve 12 when it is raised against the action of the spring 30.

The probe 20 and probes 13 are connected to the pin 15 which forms part of the conductor 16, the lower end 34 of which serves as a contact for a Continuity Ohm Meter as hereinafter described.

Referring to FIGS. 4,5, and 6, the two Continuity Ohm Meters illustrated are a small portable unit 35 for use by the pilot of an aircraft and a larger unit 36 for use by the ground staff. The manner of operation of both meters is essentially the same and thus only the operation of unit 36 will be described in detail.

The meter 36 comprises a tube or pipe 37 adapted to surround the valve 12 by engagement in a channel or groove 37a in the plug unit 10. The pipe 37 is wired into the circuit as an earth contact E. A piston 38 spaced from the pipe 37 and electrically insulated therefrom is adapted to engage the contact 34 of the metallic conductor 16. The piston 38 is located in a (P.T.F.E.) cylinder 45 and is spring loaded by means of a compression spring 46. The piston 38 is wired into the electrical circuit as the active contact thereby completing the circuit shown in FIG. 6. Additional drain holes 47 assist in passing the fuel from the valve unit 10 to the tube or reservoir 48 of the meter. Thus, by reason of one probe electrode of each pair of the probe electrodes being earthed through the plug unit, the attachment of the piston 38 to the contact 34 and the pipe 37 to the plug unit 10, the electrical circuit illustrated in FIG. 6 is completed and a reading may be taken to determine whether there is any water present at either of the probe positions. Depending on whether it is desired to take a reading at the primary probes 13 or the secondary probes 20,21, determines whether or not the primary X Ohm circuit, or secondary MEG Ohm circuit is activated by means of the circuit selection switch 39. Thus water in droplet formation at or about the probes 13 or water in suspension at or about the probes 20,21, can be measured. Generally water present as "drops" produces a resistance drop in the range of 1 to 50 K Ohms, but may be greater if much water is present.

Water linkages bridging the gap of the secondary probes 20,21 have a small cross section and research has shown that the resistance drop can give a good approximation of water concentrations in parts-per-million, i.e., 5 to 100 parts-per-million or $10^8$ Ohms to $10^6$ Ohms in the sensor circuit.

The meter is set to give a "dry" or continuity reading representing a dry fuel resistance of approximately $10^9$ Ohms. Thus in the event of there being no water present in the fuel the meter will still operate to give a dry fuel reading.

A reference point resistance 22a is provided in the insulator 14, said resistance forming a parallel circuit with the main circuit, being in contact with the earthing spring 22 and central spindle 16. This reference point resistance can be set to give a "dry" meter reading and is set preferably at about $10^9$ Ohms.

In operation, when it is desired to test the fuel to determine whether there is any water present at either of the probe positions, the meter 35 or 36 is applied to the drain plug unit 10 as aforesaid. The spring loading of the piston 38 enables the circuit to be completed without the necessity of unscrewing the washer 28. Thus by activation of the selector switch 39, a reading can be taken on both the K Ohm and MEG Ohm scales thereby determining the presence of water as "drops" or in suspension at the probe positions.

If water is present at either probe position, the washer 28 is unscrewed and the meter re-applied. The application of the meter in this case causes the valve 12 to be lifted off its seat and fuel is permitted to escape through or into the meter. The action of lifting the valve 12 causes the gap between probes 13 and valve to be widened thereby breaking any water linkage or bridge therebetween and also the upward movement of probe 20 past the flicker bar 24 causes the bar 24 to flick the reed 25 on probe electrode 20 thereby vibrating the electrode and breaking any linkages of water between the probes 20, 21. Thus, on removal of the meter and re-tightening of the washer 28 a fresh test can be performed with the knowledge that the water previously at the probe positions has been removed. If the new test indicates the presence of water, the operation of drainage of the fuel is repeated, and if after several operations, water is still present, general draining of the fuel tank would appear necessary. However, in most cases water is present only in small quantities and it can usually be expelled from the tanks in the aforesaid manner.

The meter has a tube or reservoir 48, preferably of glass or plastic material whereby the amount of fuel collected may be observed thereby preventing overflow. The reservoir 48 may be unscrewed from the meter body thus enabling the fuel sample to be taken to a laboratory or the like for testing. A new reservoir is then attached and thereby the meter is not unserviceable for any appreciable period.

In accordance with the embodiment illustrated in FIG. 7, a meter 50 is basically the same as meter 36 but in this embodiment there is provided a plug-in probe unit 51 which is designed to detect the presence of water in the fuel which has been expelled from a drain plug as the fuel passes into the reservoir 52. The provision of the unit 51 in the flow line enables the presence of water to be detected when the meter is used in association with drain plug units not embodying the sensing probes of FIG. 1.

The unit 51 includes a P.T.F.E. plug 53 adapted to fit tightly in the drain tube 54 of the meter 50. A gold plated wire electrode 55 is mounted in the plug 53 in the manner illustrated, i.e., centrally within a drain passage 56 of approximately one-eighth inches diameter. A metal collar or the like 57 is inserted in the P.T.F.E.

around the top or entrance 58 of the passage 56 and the top of the plug 53 tapers inwardly and downwardly towards the central passage. The electrode 55 is connected by means of P.T.F.E. coated wire 59 to a selector switch 60. The metal collar 57 is connected by means of a P.T.F.E. coated wire 61 to earth. The circuit is essentially the same as that in the previous embodiment, the switch 60 serving to activate the electrode 55 of the unit 51 whilst at the same time inactivating the contact of the plunger 38. Reversal of the switch 60 causes electrode 55 to become inactive and activates the connection to the plunger 38. It will thus be seen that the meter 50 can be used in association with units of the type illustrated and described with reference to FIG. 1 wherein the detection of water in the fuel is achieved by the sensing probes in the plug unit in the aircraft or the like and is measured as previously described. The meter 50 can also be used in association with drain plugs not embodying the invention of FIG. 1 in which case the presence of water in the fuel is detected and measured as the fuel drains through the passage 56. Any water present in the fuel will form a conductive link or bridge between the electrode 55 and collar 57, the amount of water present being indicated on the meter scale.

The (P.T.F.E.) coated wires or suitable connecting terminals 59,61 are passed through a sealed plug 62 thereby preventing leakage of fuel into the meter.

A by-pass tube 63 is provided to permit drain-off to the reservoir 52 when the fuel builds up because of the restricted flow through the passage 56. This does not affect the measurement of water contamination, as any water present will fall to the low point and will therefore pass through the sensor passage 56 and bridge the gap between the electrode 55 and collar 57 completing an electrical circuit, the strength of which is measured on the meter scale.

Restricted flow at the entrance to the sensor passage 56 also provides a delay action when water is in the sensor passage. The transient delay gives ample indication on the meter of the presence of and amount of water in the fuel.

It is important that water will not remain bridging the sensor when only clean fuel is flowing. Thus the design and arrangement of the electrodes 55 in the sensor unit 51 is such that any water detected must pass down the centre element 56. This is due to the natural surface tension attraction of water to follow a path which leads into the insulated section. If supports were mounted in the sensor passage section 36, water would remain held across these supports and give false readings.

I claim:

1. Apparatus for detecting the presence of water in aircraft fuel tanks or the like, comprising a sampling drain plug unit including first and second sensing electrode means selectively operable for detecting the presence of water in the fuel in drops and for detecting the presence of water in suspension in the fuel, said first and second sensing electrode means including first and second sensing electrodes, said plug unit further comprising external electrical contact points, said first sensing electrode being adapted to detect the presence of water in the fuel in drops, and said second sensing electrode being adapted to detect the presence of water in suspension in the fuel, both said first and second electrodes being connected to said external contact points, whereby a Continuity Ohm Meter can be selectively applied to said first and second electrodes through said external contact points to test the conductivity of the fuel adjacent said first and second sensing electrodes.

2. Apparatus for detecting the presence of water in fuel in aircraft fuel tanks or the like comprising:
   a sampling drain plug unit engageable in a drain opening of said tank;
   a valve extending upwardly into said tank through said plug unit;
   an electrical conductor extending through said valve;
   an electrical insulator attached to said valve;
   a valve plug attached to said plug unit and surrounding said valve;
   a first sensing electrode means for detecting the presence of water in said fuel in the form of drops, said first sensing electrode means comprising a pair of probe contacts mounted on said insulator, first ends of said probe contacts being connected to said conductor, second ends of said probe contacts positioned to provide anti-fouling gaps with said valve plug;
   a second sensing electrode means for detecting the presence of water in suspension in said fuel;
   said plug unit and said conductor forming external contact points;
   both of said first and second sensing electrode means being connected to said external contact points; and
   whereby a Continuity Ohm Meter may selectively be applied to said external contact points to test the conductivity of said fuel adjacent said first and second sensing electrode means.

3. Apparatus as claimed in claim 2, wherein said gaps may be selectively varied between a minimum gap setting of 0.002 inches and a maximum setting of 0.25 inches.

4. Apparatus for detecting the presence of water in fuel in aircraft fuel tanks or the like comprising:
   a sampling drain plug unit engageable in a drain opening in said tank and having first and second independent external contact points;
   first sensing electrode means for detecting the presence of water in said fuel in drops;
   second sensing electrode means for detecting the presence of water in suspension in said fuel;
   said second electrode means comprising a pair of spaced probe contacts mounted on the top of said plug unit; one of said probe contacts being connected to said first external contact point, and the other of said probe contacts being connected to said second external contact point; and
   whereby a Continuity Ohm Meter may be selectively applied to said contact points to test the conductivity of said fuel adjacent said first and second sensing electrode means.

5. Apparatus as claimed in claim 4, wherein each of said probe contacts are provided with a knife-edge, said knife edges being spaced apart a distance of 0.001 to 0.005 inches.

6. Apparatus as claimed in claim 4, further comprising a flicker bar mounted on said plug unit, said flicker bar being adapted to engage a reed on one of said probe contacts, whereby the contact therebetween is vibrated when said probe contacts are selectively raised, thereby breaking any water linkages between said probe contacts.

7. Apparatus for detecting the presence of water in aircraft fuel tanks or the like comprising:
- a sampling drain plug unit including at least one sensing electrode means selectively operable for detecting the presence of water in the fuel in drops and for detecting the presence of water in suspension in the fuel;
- a drain outlet in said plug unit;
- a Continuity Ohm Meter having pipe means for engaging said plug unit in electrical contact therewith and surrounding said drain outlet;
- a piston positioned in said pipe and electrically insulated therefrom;
- said plug unit have a contact point extending outwardly therefrom;
- said piston being selectively engageable with said contact point;
- a meter having an electrical circuit including said pipe and piston; and
- whereby the presence of water adjacent said at least one sensing electrode means may selectively be detected and the conductivity thereof measured.

8. Apparatus as claimed in claim 7, wherein said circuit further comprises a scale selector switch, at a first position of which said meter is adapted to indicate the presence of water in suspension in said fuel on a Meg Ohm scale, and at a second position of which said meter is adapted to indicate the presence of water in drops in said fuel on a K Ohm scale.

9. Apparatus as claimed in claim 7, wherein said Continuity Ohm Meter further comprises a fuel flow line; and an anti-fouling sensing unit mounted in said fuel flow line, said sensing unit including an electrically insulated plug adapted to fit in said fuel flow line, said plug having a central passage therein and an electrode located centrally within said passage, a metallic contact inserted in said insulated plug and surrounding the inlet to said passage, said centrally located electrode and said metallic contact being connected to the live and ground terminals of an electrical circuit, whereby any water present in the fuel passing through said passage will form links between said electrode and said metallic contact, the arrangement being such that the conductivity of water present can be measured on a scale of said Continuity Ohm Meter.

10. Apparatus as claimed in claim 9 wherein said circuit further comprises an electrode selector switch, said switch having a first position isolating said meter from the circuit for measuring the conductivity of said fuel as detected by said sampling drain plug unit, the conductivity of said fuel being measured as said fuel passes said electrode mounted in said passage in said insulated plug; said electrode selector switch having a second position isolating said insulated plug electrode circuit from said meter, thereby permitting the conductivity of said fuel to be measured as a result of said meter being applied to said drain plug unit.

11. Apparatus as claimed in claim 9, wherein said electrically insulated plug is of P.T.F.E., and said centrally located electrode and said metallic contact are arranged to prevent any water remaining in contact therewith after detection.

12. Apparatus as claimed in claim 9, further comprising a fuel by-pass tube arranged in parallel with said sensing unit, said by-pass tube being adapted to drain off fuel from said flow line when said fuel builds up to a predetermined level above said sensing unit and delivers said drained off fuel to a reservoir downstream of said sensing unit.

* * * * *